United States Patent
Jong et al.

(10) Patent No.: US 7,962,652 B2
(45) Date of Patent: Jun. 14, 2011

(54) DETECTING NETWORK TOPOLOGY WHEN NEGOTIATING IPSEC SECURITY ASSOCIATIONS THAT INVOLVE NETWORK ADDRESS TRANSLATION

(75) Inventors: Wuchieh James Jong, Raleigh, NC (US); Linwood Hugh Overby, Jr., Raleigh, NC (US); Joyce Anne Porter, Apex, NC (US); David John Wierbowski, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 11/307,598

(22) Filed: Feb. 14, 2006

(65) Prior Publication Data
US 2007/0192848 A1 Aug. 16, 2007

(51) Int. Cl.
*H06F 15/16* (2006.01)
(52) U.S. Cl. ............... 709/245; 726/11; 726/14; 726/2; 726/5; 709/225; 709/232; 709/237
(58) Field of Classification Search ............... 713/201, 713/150; 726/14, 3, 4, 17, 6
See application file for complete search history.

(56) References Cited

U.S. PATENT DOCUMENTS

| | | | |
|---|---|---|---|
| 6,957,346 B1* | 10/2005 | Kivinen et al. ............... 713/153 |
| 7,434,045 B1* | 10/2008 | Enderwick et al. ............ 713/158 |
| 2001/0047487 A1* | 11/2001 | Linnakangas et al. ........ 713/201 |
| 2002/0091921 A1 | 7/2002 | Kunzinger |
| 2003/0018908 A1* | 1/2003 | Mercer et al. ................. 713/193 |
| 2004/0071149 A1 | 4/2004 | Kim et al. |
| 2004/0088537 A1* | 5/2004 | Swander et al. ............... 713/153 |
| 2004/0098622 A1* | 5/2004 | O'Neill ............................ 713/201 |
| 2004/0117653 A1* | 6/2004 | Shapira et al. ................. 713/201 |
| 2004/0148504 A1* | 7/2004 | Forsberg ........................ 713/168 |
| 2004/0249911 A1* | 12/2004 | Alkhatib et al. ............... 709/223 |
| 2005/0160273 A1* | 7/2005 | Oishi ............................. 713/180 |
| 2006/0245362 A1* | 11/2006 | Choyi ............................ 370/238 |

OTHER PUBLICATIONS http://www.cs.virginia.edu/~cs458/material/Redbook-ibm-tcpip-Chp21-4.pdf "Network Address Translation"—UVA Technical Overview.*
http://vpncasestudy.com/download/troubleshoot/Troubleshooting_IKE_VPN.pdf "Troubleshooting Guide: IKE IPSec VPN Initialization"—VPN Cast Study Feb. 2007.*
http://www.ietf.org/rfc/rfc3947.txt "Negotiation of NAT D payloads"—RFC 3947.*
Sternberg, M. et al, "IPsec NAT-Traversal draft-stenberg-spec-nat-traversal-02.txt." IETF Standard-Working-Draft, Internet Engineering Task Force, IETF, CH, No. 2, Feb. 28, 2001.
Pouseele, S., "How to Pass IPSec traffic through ISA Server," http://www.isaserver.org/pages/article_p.asp?id=1072, last update Mar. 26, 2005.
Huttunen, A, "UDP Encapsulated of IPSec ESP Packets," Network Working Group, RFC 3948, The Internet Society, Jan. 2005, pp. 1-15.
Kivinen Safenet B Swander Microscoft A Huttunen F-Secure Corporation V Volpe Cisco Systemst: "Negotiation of NAT-Traversal in the IKE" IETF Standard, Internet Engineering Task Force, IETF, CH, Jan. 2005, XP015009719.
Stenberg S Paavolainen T Ylonen T Kivinen SSH Communications Security Corp M: "IPsec NAT-Traversal" Engineering Task Force, IETF, CH, No. 2, (Feb. 8, 2001), XP015035694.
PCT/EP2007/050834 International Search Report, May 18, 2007.

* cited by examiner

*Primary Examiner* — Krista M Zele
*Assistant Examiner* — Randy Scott
(74) *Attorney, Agent, or Firm* — Steven M. Greenberg, Esq.; Carey, Rodriguez, Greenberg & Paul

(57) ABSTRACT

The invention determines if a security association (SA) extends end-to-end between a source node originating a connection and a destination node. In such a case, there will be no ambiguities in routing due to network address translation, and the SA is allowed. In the preferred embodiment, both end nodes of a security connection test themselves and the remote node for gateway status to determine if any ambiguities might exist in network routing due to the presence of a network address translator.

22 Claims, 5 Drawing Sheets

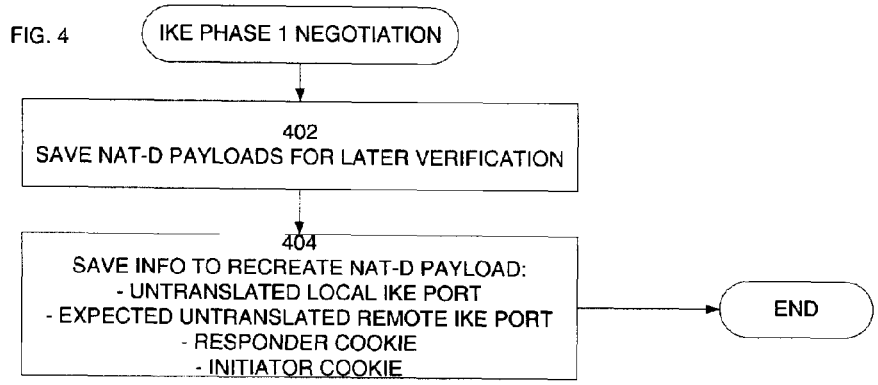
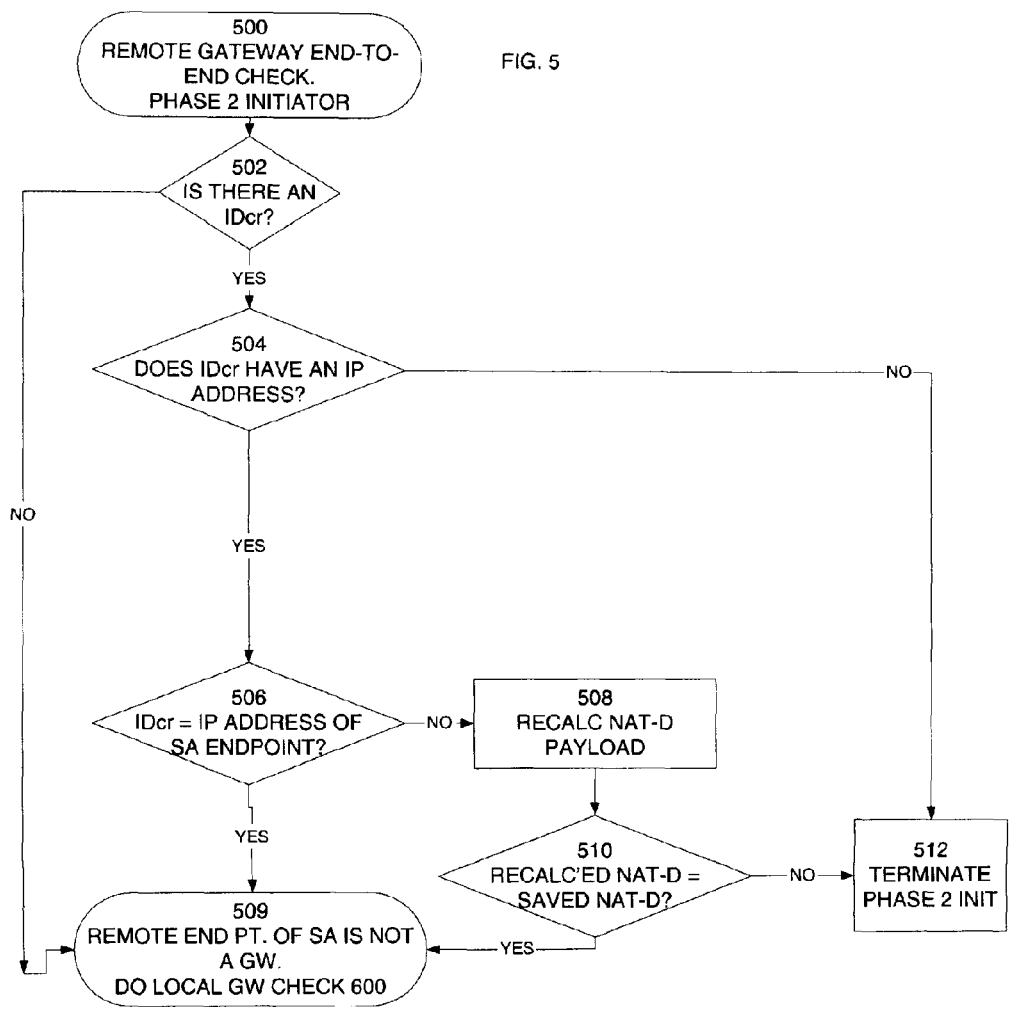

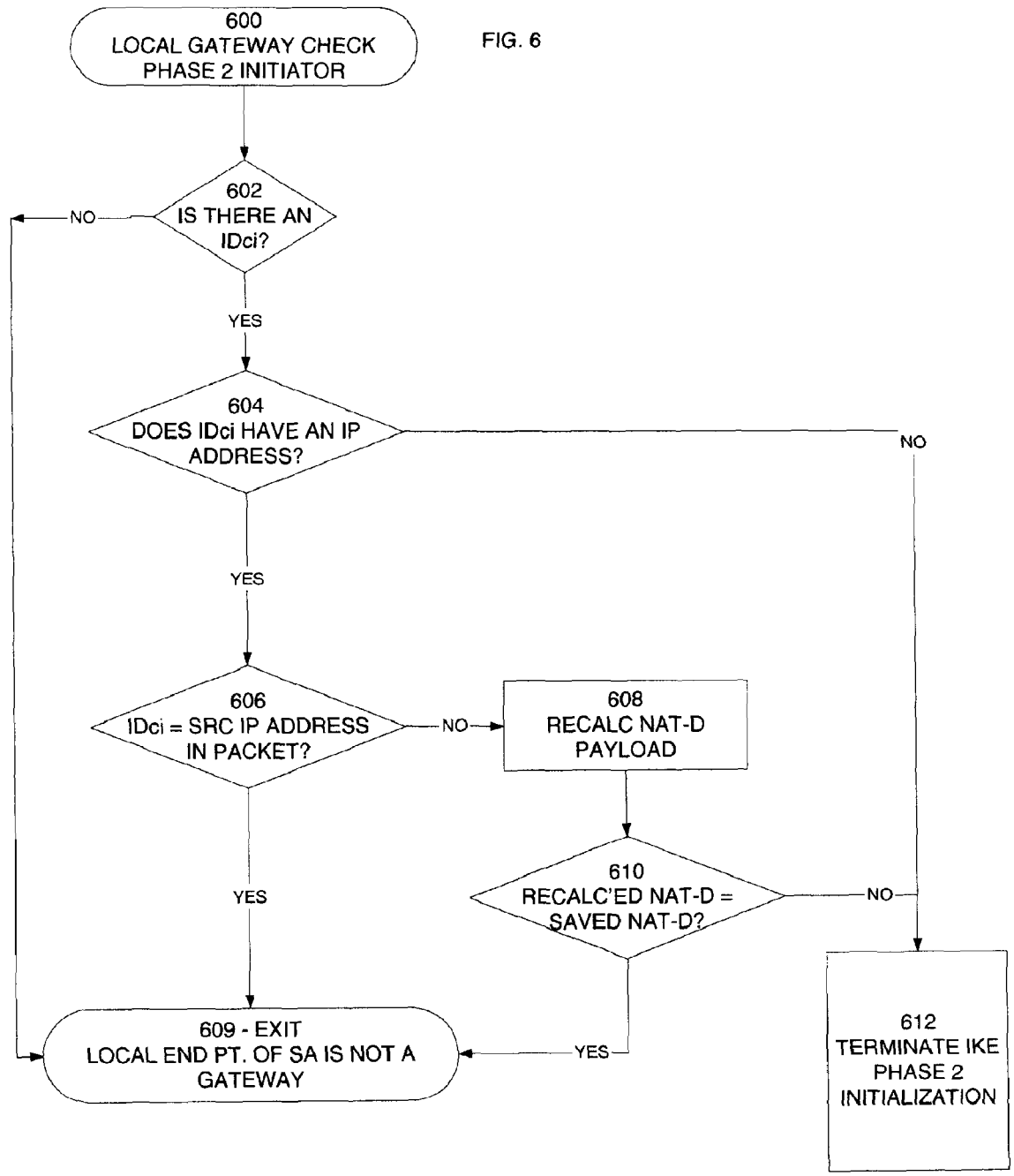

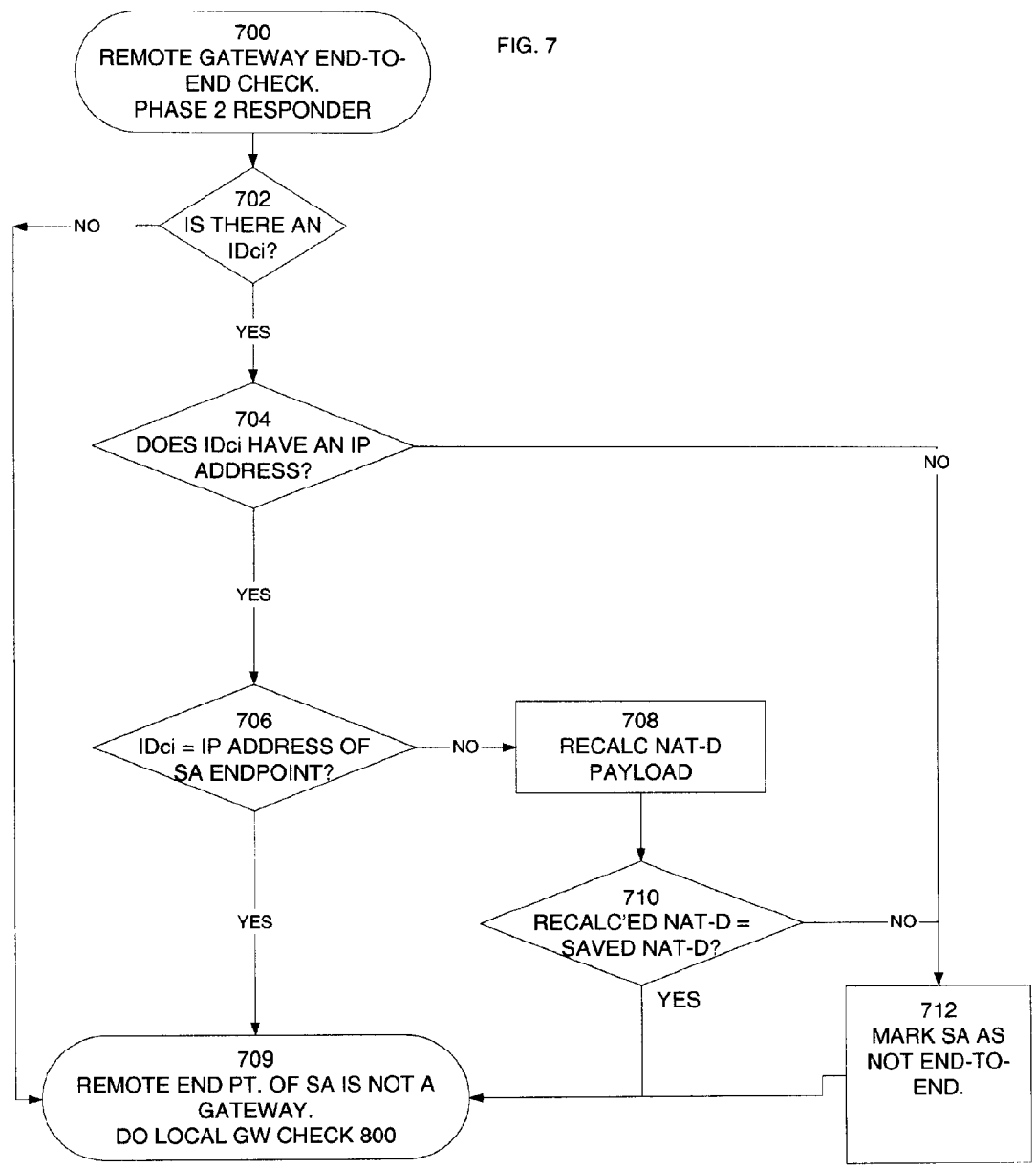

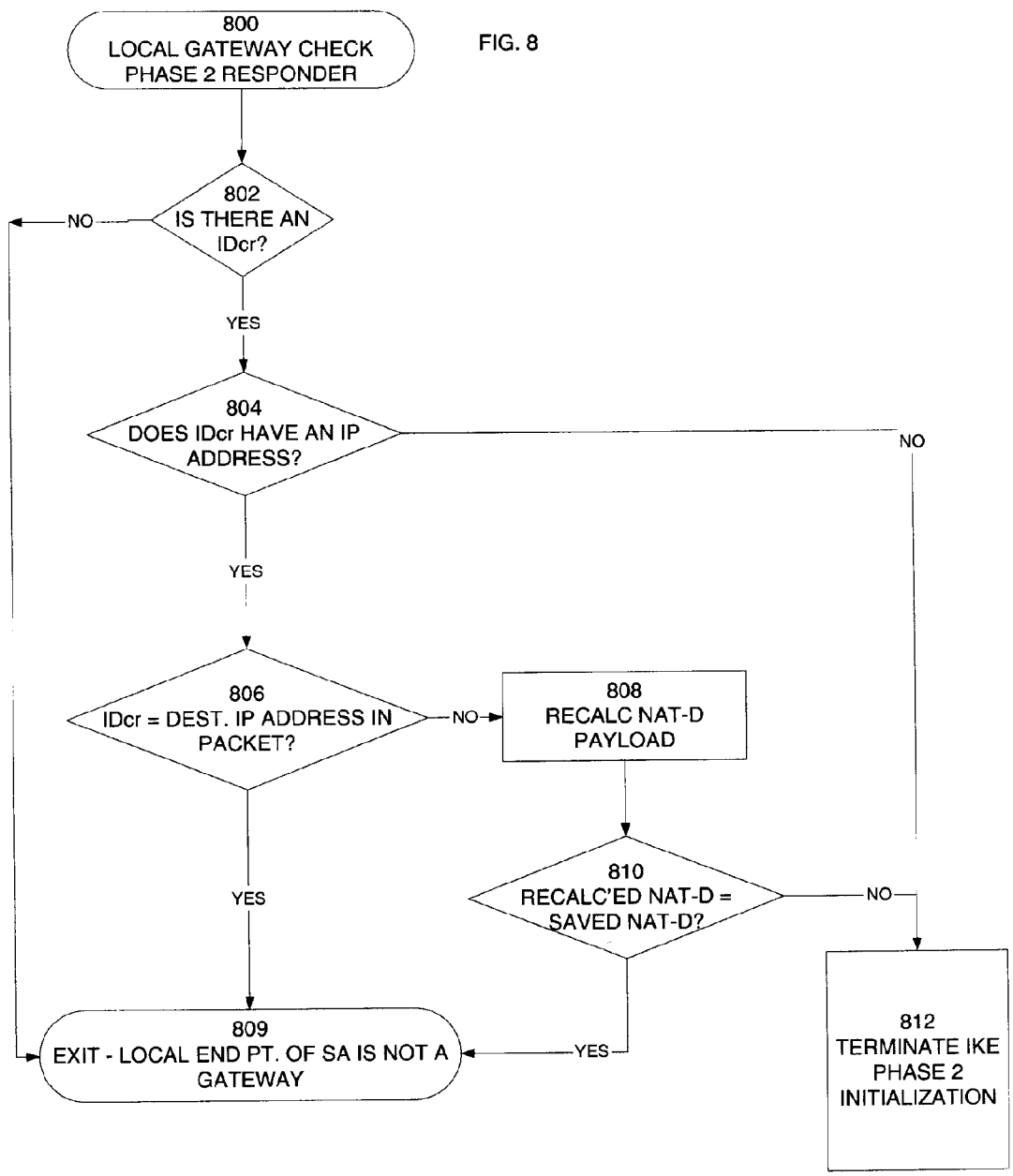

DETECTING NETWORK TOPOLOGY WHEN NEGOTIATING IPSEC SECURITY ASSOCIATIONS THAT INVOLVE NETWORK ADDRESS TRANSLATION

The invention relates generally to internet networking and specifically to ambiguous situations in network topology caused by network address translation with respect to negotiating security associations. Such ambiguities can arise when a security association does not extend end-to-end between a server and client.

BACKGROUND OF THE INVENTION

The problems and solutions addressed by the invention are described herein in terms of the Internet and the TCP/IP protocols that form the basis of Internet communications. However, the invention can apply to other communication protocols as well, depending on the specifics of the protocols.

Internet Network Address Translation is used for several reasons. The main reason is to economize on the use of public addresses. The Internet Protocol (IP) address of a Network Address Translator (NAT) is generally a public address. That is, the NAT IP address is known to the outside world, while all of the servers or clients behind the NAT are private addresses administered by the NAT and unknown to the outside world. In such a case, the outside world communicates with the NAT and the NAT controls the communications with the appropriate servers and clients behind it. This means that the IP addresses of devices behind the NAT only have to be unique within that family, but can be duplicative of other IP addresses in the rest of the world. The standards for Network Address Translation (NAT) are set forth in the Internet Engineering Task Force (IETF) RFC 3022, entitled "Traditional IP Network Address Translation".

The original Internet was not designed with security as a primary factor. In fact, the Internet was purposely made relatively open as an aid to scientific and educational communication. However, the advent of the Web and its commercial uses has increased the need for secure Internet communications. The Internet Security Protocol, commonly known as IPsec, was defined to address these issues. For example, IPsec provides for the authentication of network users and/or for the encryption of transmitted data. An IPsec communication between source and destination addresses is administered in accordance with a security association (SA), which is one or more rules that define the IPsec processing that is applied to the communication. IPsec is defined in RFC 2401 and other RFCs.

There are inherent incompatibilities between network address or port translation and IPsec processing. These incompatibilities are a barrier to deployment of IPsec. RFC 3715 recognizes and discusses some of these incompatibilities, but offers no general solutions. Two patent applications assigned to IBM solves some of these incompatibilities relating to duplicate packet sources in an environment involving network address port translation (NAPT). The first, entitled "Negotiating IPsec Security Associations and Preventing Duplicate Sources in Networks that Involve Network Address Network Translation" is given Ser. No. 10/907,661. The second is an improvement to Ser. No. 10/907,661, and is given Ser. No. 10/907,659. The applications are incorporated by reference into this application in their entirety.

There are certain situations that occur during negotiations of IPsec security associations that require recognition of certain network topologies to avoid improper or erroneous results. For example, when a connection includes a network address translator (NAT), a host may need to reject a SA negotiation if a server is trying to initiate a tunnel mode SA that terminates in an intermediate router or security gateway. In such cases, an involved IP address can be private, meaning that it might be impossible for the host to route packets properly. Other situations involving network address port translation (NAPT) can result in a problem of duplicate IP sources. This means that it is possible to receive packets from different sources that contain identical source IP addresses. Solutions to the duplicate source problem are addressed in the patent application Ser. Nos. 10/907,661 and 10/907,659, identified above. It is also advantageous if, during SA negotiations, a server identifies situations in which the solutions of these patent applications can be applied.

SUMMARY OF THE INVENTION

The present invention supplements the incorporated applications above with respect to the negotiation of security associations (SA) in an environment involving network address translation (NAT). Specifically, the invention determines if a SA extends end-to-end between a source node originating a connection and a destination node. In such a case, there will be no ambiguities in routing due to network address translation, and the SA is allowed.

In the preferred embodiment, a node initiating a security association (SA) negotiation determines if it is a gateway to other source or destination nodes; if the initiating node is a gateway, the SA is denied. The initiating node also tests the remote end of the SA (the node responding to an SA negotiation) to determine if the remote end is a gateway. The SA is also denied in this instance in the preferred embodiment.

In the preferred embodiment, the responding node also performs it's own tests to determine end-to-end connectivity. Specifically, the responding node determines if it is a gateway to source or destination nodes and if so, it denies the SA. In addition, the responding node determines if the node initiating the SA is a gateway to source or destination nodes; if this is the case, the SA is not denied. Rather, the SA is marked at the responding node as being not end-to-end. On connection setups subsequent to the establishment of the SA, the responding node uses the solutions of the aforementioned application Ser. Nos. 10/907,661 and 10/907,659 to avoid duplicate source problems that can arise in this situation.

BRIEF DESCRIPTION OF THE DRAWINGS

FIG. 4 is a flowchart that shows steps performed at a server during phase 1 of a SA negotiation to save information needed later during phase 2 to determine if the SA from the server extends end-to-end (FIG. 1) or to a remote gateway (FIG. 2).

FIGS. 5 and 6 contain flowcharts executed at a server during phase 2 of a SA negotiation when the server is the initiator of the negotiation; the purpose is to determine which configuration of FIGS. 1-3 applies.

FIGS. 7 and 8 contain flowcharts executed at a server during phase 2 of a SA negotiation when the server is responding to a negotiation initiated at a remote end; the purpose is to determine which configuration of FIGS. 1-3.

DETAILED DESCRIPTION OF THE INVENTION

Figure 1:
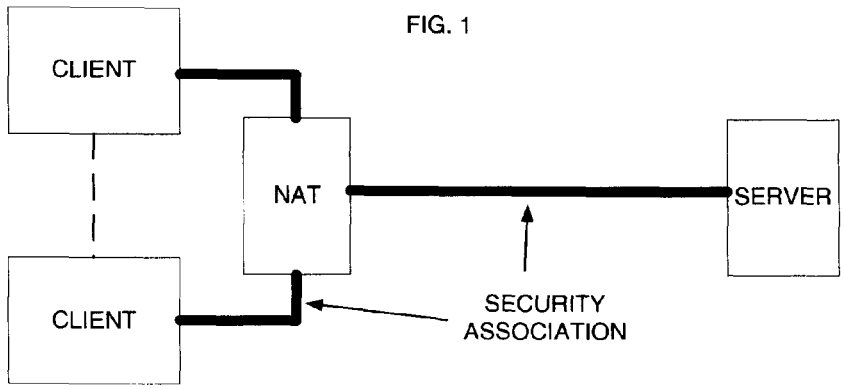
FIG. 1 shows a network configuration in which a negotiated SA extends end-to-end through a NAT between two network peers, such as the server and the clients shown in this figure. There is no problem with negotiating SA's in this configuration.

FIG. 1 shows a network configuration in which a negotiated SA extends end-to-end through a NAT between client and server. No network ambiguities are introduced by this configuration in the negotiation of security associations. The extent of a security association is indicated in this Fig., and also in FIGS. 2 and 3, by the heavy black line.

Figure 2:
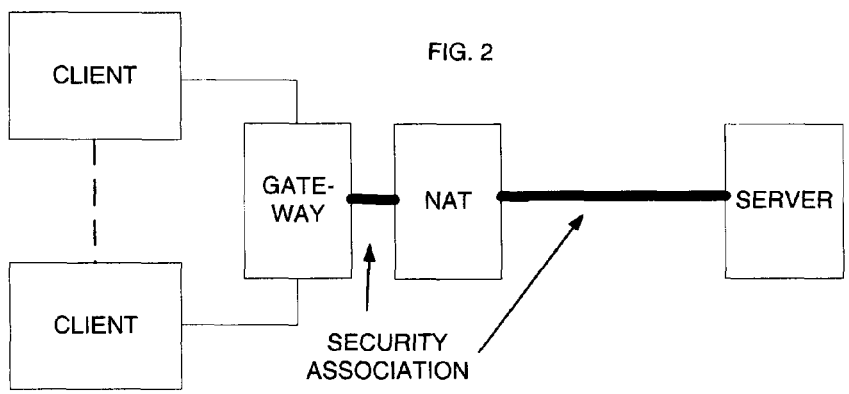
FIG. 2 shows a network configuration in which a negotiated SA extends through a NAT between two network peers in which the remote peer is a gateway node. An IPSec implementation at the SERVER may restrict the negotiation of SAs in this configuration in order to avoid problems with IP address ambiguity which require special treatment.

FIG. 2 shows a network configuration in which a negotiated SA extends through a NAT between a server and a gateway in front of plural clients. This configuration may require special treatment, because the security association does not extend end-to-end, but ends at the gateway.

Figure 3:
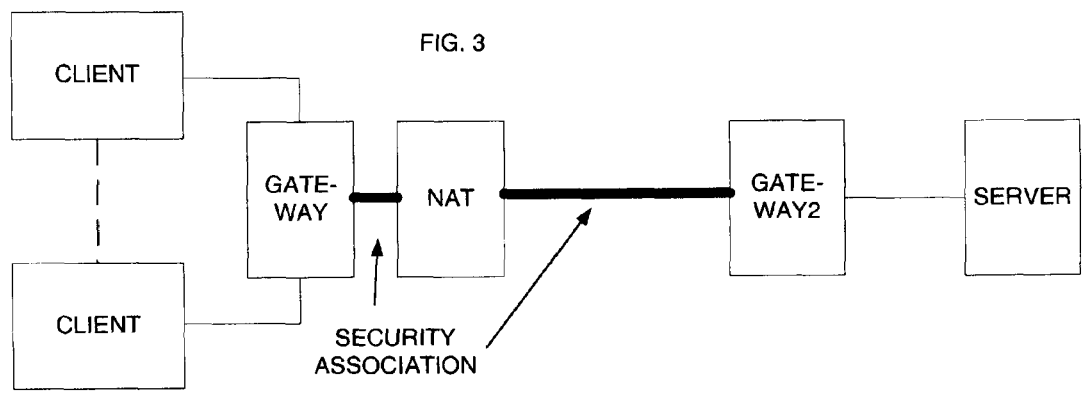
FIG. 3 shows a network configuration similar to that of FIG. 2, but in which the local peer at which the SA terminates acts as a server gateway (GATEWAY2) to another destination server. An IPSec implementation at GATEWAY2 may restrict the negotiation of SAs in this configuration, in order to avoid problems with routing packets with private IP addresses.

FIG. 3 shows a network configuration similar to that of FIG. 2, but in which the security association terminates at a gateway (GATEWAY2) to the destination server. IPSec in this configuration may be disallowed because of the possibility that GATEWAY2 may receive packets with private IP addresses may not be routable by GATEWAY2.

The invention determines which of these configurations applies to a specific SA negotiation and takes steps to resolve any network ambiguities by accepting or rejecting a security association, or in certain situations, applying the duplicate source solutions of patent application Ser. Nos. 10/907,661 and 10/907,659.

FIG. 4 shows steps taken during phase 1 of a SA negotiation to save information necessary for use by the invention during a phase 2 SA negotiation. The steps of FIG. 4 are performed at both a node initiating phase 1 of an SA and a node responding to the phase 1 initiation. Specifically, the NAT discovery payloads NAT-D are saved in step 402. According to RFC 3947, the NAT-D payload can be used to detect the presence of a NAT between two Internet Key Exchange (IKE) peers. The NAT-D payloads are later recalculated by the invention in some cases during phase 2 SA negotiation and compared to the values saved in 402 to determine if a problem configuration exists. Step 404 saves information during a phase 1 SA negotiation that allows the later recalculation of NAT-D payloads. Specifically, this information is the remote peer's view of it's IKE port value, the local port value on which the phase 1 packet was received, and the initiator and responder cookies CKY-I and CKY-R, respectively. The remote peer's view of his local IKE port value is the expected untranslated value set from the table below:

| Mode | Local Role | Expected Remote Port Value Saved When Creating an Initial Phase 1 SA | Expected Remote Port Value Saved When Refreshing an existing Phase 1 SA |
|---|---|---|---|
| Aggressive | Initiator | 500 | 4500 |
| Aggressive | Responder | 4500 | 4500 |
| Main | Initiator | 500 | 4500 |
| Main | Responder | 500 | 4500 |

FIGS. 5 and 6 show steps taken during SA phase 2 at a server or a gateway that is initiating the SA. If the SA initiator is a server, FIG. 5 tries to determine if the SA extends to the remote client of the connection (end-to-end), as shown in FIG. 1, or if it terminates at a gateway as shown in FIG. 2. If the initiator is a gateway as in FIG. 2, then the steps in FIG. 5 determine if the SA extends to a server, as shown in FIG. 2, or to a gateway such as GATEWAY2, as shown in FIG. 3. Similarly, FIG. 6 tries to determine if the initiator is a gateway. Again, such a SA terminating at a gateway is disallowed in the preferred embodiment A phase 2 SA message might contain two payloads IDci and IDcr that are used for the determinations of FIGS. 5 and 6. If present, these payloads contain the IP addresses of the SA initiating peer and the responding peer, respectively. Step 502 in an SA initiator determines if IDcr is present. If not, it is immediately known that the SA extends end-to-end as in FIG. 1. In this case execution proceeds to 509, which begins a local gateway check shown in FIG. 6. Assuming that IDcr is present, step 504 determines if it contains an IP address. If it does not contain an address, the SA configuration between peers cannot be determined, and the SA is aborted at step 512. If IDcr does contain an IP address, step 506 compares the IDcr address to that of the remote SA endpoint obtained from the IP header of an IP packet containing a received phase 2 message. If the match is successful, that establishes that the SA extends end-to-end, and execution again proceeds to step 509 and the local gateway check. If the comparison at 506 fails, then it becomes necessary to recalculate the NAT-D payload and compare that to the value saved at 402 of FIG. 4 to determine the end-to-end status. Step 508 recalculates the NAT-payload. Step 510 makes the comparison. If the comparison succeeds, the local gateway check starting at 509 is performed. If the comparison fails, this means that the remote end of the SA terminates at a gateway as shown in FIG. 2.

Because of addressing ambiguities for the clients, the SA is rejected at step 512. The method of calculation of the NAT-D payload is specified in section 3.2 of RFC 3947.

In the configuration of FIG. 3, the gateway, GATEWAY2, routes packets on to a destination server. When the local end of an SA terminates at a gateway such as GATEWAY2, this is a configuration that may not be allowed in the preferred embodiment because of the possibility of private IP addresses which may not be routable by the gateway; If this configuration is not allowed, the SA must not be established in this circumstance. These steps are very similar to those of the end-to-end check of FIG. 5. However, since the check is for a gateway status of the SA initiator to another destination node, the tests focus on the equality of the initiator IP address to that of the IDci field of the NAT-D payload. If there is no IDci field at step 602, this server is not a gateway to another destination server and normal SA processing is allowed to continue at step 609. If the IDci field is present at 602, but contains no IP address at step 604, it cannot be determined if duplicate sources are detectable; in this case the SA negotiation is terminated at 612. If IDci contains an IP address at 604, then step 606 compares the value of the source IP address in the packet to the value in IDci. If they match, this determines that the immediate server is not a gateway and normal processing continues at 609. If the 606 comparison fails, a recalculation of the NAT-D payload and comparison of it to the saved value from step 402 becomes necessary. Step 608 performs the recalculation; step 610 makes the comparison. If it succeeds, normal processing continues at 609. Otherwise, the SA negotiation is terminated at 612.

FIGS. 7 and 8 are the corresponding flowcharts of FIGS. 5 and 6, respectively, for the situation in which the server in question is responding to a SA negotiation initiated by remote peer. FIG. 7 is the end-to-end check for this responding situation. FIG. 8 is the local gateway check for this situation. There is no need to discuss these flowcharts in detail as done for FIGS. 5 and 6. The flowcharts are provided for completeness of this specification. The corresponding Figs. are identical to each other in most respects, the differences being only whether IDcr or IDci is used in the steps, and which IP address is relevant, the source or the destination IP address in the phase 2 packet. The end-to-end check in the responding situation (FIG. 7) uses IDci and the IP address of the remote initiator. Note that in step 712, the phase 2 SA negotiation at a responding node is not terminated, but rather is marked as not end-to-end. In this case, source port translation as described in patent application Ser. Nos. 10/907,661 and 10/907,659 can be used at the responder to avoid ambiguities of duplicate sources for the client hosts. The local gateway check of FIG. 8 in this responding situation uses IDcr and the destination IP address in the phase 2 packet.

Artisans in the field of the invention will realize that there are many variations that are within the spirit and scope of the preferred embodiment. It is the intent of the inventors to encompass these variations to the extent possible according to the state of the relevant art and the law.

What is claimed is:

1. A method, within a first computer node, of initiating an IPsec security association negotiation between the first computer node and a second computer node, comprising:
   receiving a security association message including an IDcr payload from the second computer node;
   determining whether the IDcr payload includes an address or not;
   comparing the address in the IDcr payload to an address of the second computer node upon determining that the IDcr payload includes the address;
   recalculating a NAT-D payload upon determining that the address in the IDcr payload does not match the address of the second computer node; and
   selecting, based upon the recalculated NAT-D payload, between
      rejecting the security association negotiation and
      allowing the security association negotiation to continue.

2. The method of claim 1, wherein
   the selecting includes comparing the recalculated NAT-D payload to a previously-saved NAT-D payload, wherein upon the recalculated NAT-D payload matching the previously-saved NAT-D payload, the allowing the security association negotiation to continue is selected.

3. The method of claim 1, wherein
   the selecting includes comparing the recalculated NAT-D payload to a previously-saved NAT-D payload, wherein upon the recalculated NAT-D payload not matching the previously-saved NAT-D payload, the rejection the security association negotiation is selected.

4. The method of claim 1, wherein
   the first computer node is a server.

5. The method of claim 1, upon the allowing the security association negotiation to continue being selected, further comprising:
   determining whether an IDci payload contained with the security association message includes an address or not; and
   comparing the address in the IDci payload to the address of the second computer node upon determining that the IDci payload includes the address.

6. The method of claim 5, further comprising
   allowing the security association negotiation upon determining that the address in the IDci payload matches the address of the second computer node.

7. The method of claim 5, further comprising
   further recalculating the NAT-D payload upon determining that the address in the IDci payload does not match the address of the second computer node; and
   selecting, based upon the further recalculated NAT-D payload, between
      rejecting the security association negotiation and
      allowing the security association negotiation to continue.

8. A method, within a first computer node, of initiating an IPsec security association negotiation between the first computer node and a second computer node, comprising:
   receiving a security association message including an IDcr payload and an IDci payload from the second computer node;
   determining whether the IDcr payload includes an address or not;
   comparing the address in the IDcr payload to an address of the second computer node upon determining that the IDcr payload includes the address;
   comparing the address in the IDci payload to the address of the second computer node upon determining that the address in the IDcr payload matches the address of the second computer node;
   recalculating a NAT-D payload upon determining that the address in the IDci payload does not match the address of the second computer node; and
   selecting, based upon the recalculated NAT-D payload, between
      rejecting the security association negotiation and
      allowing the security association negotiation to continue.

9. The method of claim 8, wherein
   the selecting includes comparing the recalculated NAT-D payload to a previously-saved NAT-D payload, wherein upon the recalculated NAT-D payload matching the previously-saved NAT-D payload, the allowing the security association negotiation to continue is selected.

10. The method of claim 8, wherein
    the selecting includes comparing the recalculated NAT-D payload to a previously-saved NAT-D payload, wherein upon the recalculated NAT-D payload not matching the previously-saved NAT-D payload, the rejecting the security association negotiation is selected.

11. The method of claim 8, wherein
    the first computer node is a server.

12. A method, within a first computer node, of responding to an IPsec security association negotiation initiated by a second computer node, comprising:
    receiving a security association message including an IDci payload from the second computer node;
    determining whether the IDci payload includes an address or not;
    comparing the address in the IDci payload to an address of the second computer node upon determining that the IDci payload includes the address;
    recalculating a NAT-D payload upon determining that the address in the IDcr payload does not match the address of the second computer node; and selecting, based upon the recalculated NAT-D payload, between
   marking the security association as not end-to-end and
   continuing the security association negotiation without marking the security association as not end-to-end.

13. The method of claim 12, wherein
the selecting includes comparing the recalculated NAT-D payload to a previously-saved NAT-D payload, wherein
upon the recalculated NAT-D payload matching the previously-saved NAT-D payload, the continuing the security association negotiation without marking the security association as not end-to-end is selected.

14. The method of claim 12, wherein
the selecting includes comparing the recalculated NAT-D payload to a previously-saved NAT-D payload, wherein
upon the recalculated NAT-D payload not matching the previously-saved NAT-D payload, the marking the security association as not end-to-end is selected.

15. The method of claim 12, wherein
the first computer node is a server.

16. The method of claim 12, further comprising:
determining whether an IDcr payload contained with the security association message includes an address or not; and
comparing the address in the IDcr payload to the address of the second computer node upon determining that the IDcr payload includes the address.

17. The method of claim 16, further comprising
allowing the security association negotiation upon determining that the address in the IDcr payload matches the address of the second computer node.

18. The method of claim 16, further comprising
further recalculating the NAT-D payload upon determining that the address in the IDcr payload does not match the address of the second computer node; and
selecting, based upon the further recalculated NAT-D payload, between
   rejecting the security association negotiation and
   allowing the security association negotiation to continue.

19. A method, within a first computer node, of responding to an IPsec security association negotiation initiated by a second computer node, comprising:
receiving a security association message including an IDcr payload and an IDci payload from the second computer node;
determining whether the IDci payload includes an address or not;
comparing the address in the IDci payload to an address of the second computer node upon determining that the IDci payload includes the address;
comparing the address in the IDcr payload to the address of the second computer node upon determining that the address in the IDci payload matches the address of the second computer node;
recalculating a NAT-D payload upon determining that the address in the IDcr payload does not match the address of the second computer node; and
selecting, based upon the recalculated NAT-D payload, between
   rejecting the security association negotiation and
   allowing the security association negotiation to continue.

20. The method of claim 19, wherein
the selecting includes comparing the recalculated NAT-D payload to a previously-saved NAT-D payload, wherein
upon the recalculated NAT-D payload matching the previously-saved NAT-D payload, the allowing the security association negotiation to continue is selected.

21. The method of claim 19, wherein
the selecting includes comparing the recalculated NAT-D payload to a previously-saved NAT-D payload, wherein
upon the recalculated NAT-D payload not matching the previously-saved NAT-D payload, the rejecting the security association negotiation is selected.

22. The method of claim 19, wherein
the first computer node is a server.

\* \* \* \* \*